P. J. SHOUGH.
TIRE CHAIN TOOL.
APPLICATION FILED JULY 15, 1920.

1,435,881.

Patented Nov. 14, 1922.
2 SHEETS—SHEET 1

Inventor
Philip J. Shough.
By Lacey & Lacey, Attorneys

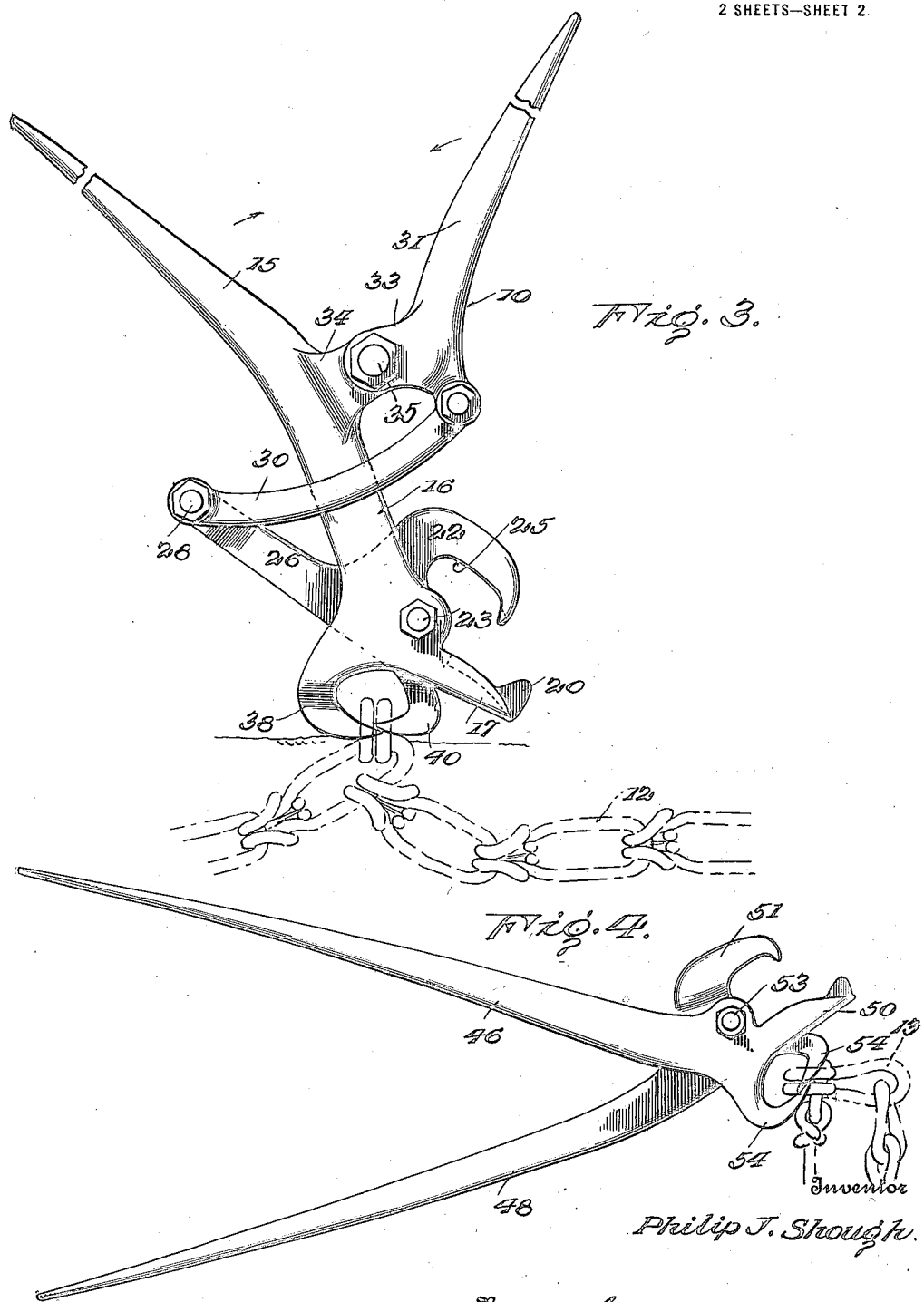

Patented Nov. 14, 1922.

1,435,881

UNITED STATES PATENT OFFICE.

PHILIP J. SHOUGH, OF NEW YORK, N. Y.

TIRE-CHAIN TOOL.

Application filed July 15, 1920. Serial No. 896,441.

*To all whom it may concern:*

Be it known that I, PHILIP J. SHOUGH, citizen of the United States, residing at New York, in the county of New York and State of New York, have invented certain new and useful Improvements in Tire-Chain Tools, of which the following is a specification.

This invention relates to improvements in tire chain tools especially adapted for use in attaching or removing the transverse chains of tire chains.

An important object of this invention is to provide a tire chain tool having novel means whereby the connecting links of the transverse chains of an anti-skid device may be readily opened regardless of the positions of the bills of the same.

A further object of the invention is to provide a tire chain tool having novel means whereby the connecting links of the transverse chains of an anti-skid device may be readily and conveniently closed for connecting the same to the links of the circumferential chain of the anti-skid device.

A further object of the invention is to provide a tire chain tool having simple means whereby one of the connecting links of the transverse chains of an anti-skid device may be held securely in position while being closed.

The invention forming the subject matter of this application aims also to provide a tire chain tool having simple means whereby the same may be supported in the proper position when in use.

A further object of the invention is to provide a tool of the class described which is highly compact so that the same may be carried in the tool compartment of a motor vehicle without occupying an excessive amount of space.

A further object of the invention is to provide a tire chain tool of the class described which is of highly simplified construction, efficient in use, and cheap to manufacture.

Other objects and advantages of the invention will be apparent during the course of the following description.

In the accompanying drawings forming a part of this application and in which like numerals are employed to designate like parts throughout the same.

Figure 3 is a fragmentary side elevation of the improved tire chain tool, this view illustrating the link opening operation.

Figure 4 is a side elevation of a slightly modified form of the invention.

Figures 1, 2:
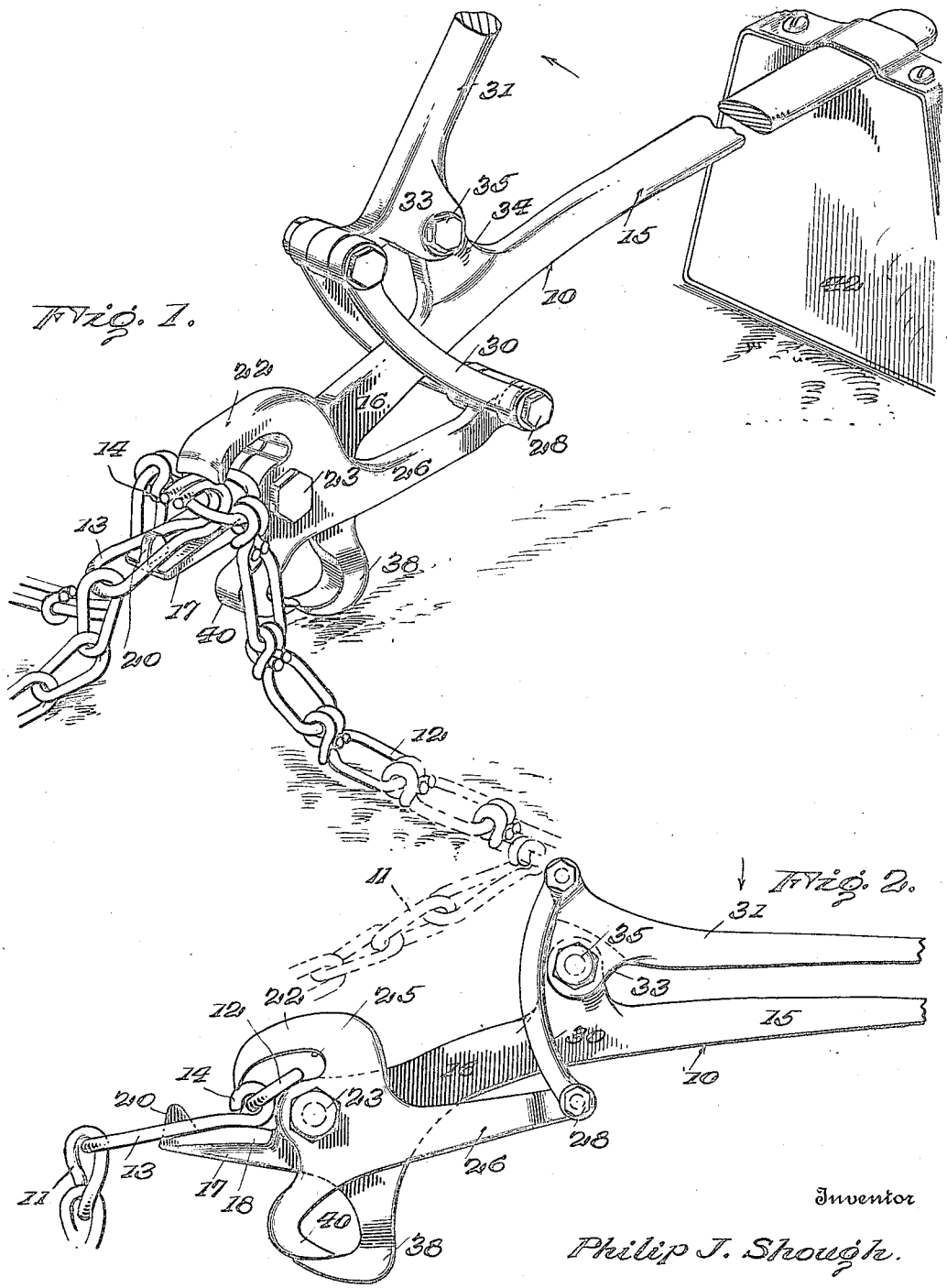
Figure 1 is a perspective of the improved tire chain tool, this view illustrating the means for closing the connecting links of the transverse chains forming a part of an anti-skid device.
Figure 2 is a fragmentary side elevation of the tool at the completion of the link closing operation.

In the drawings, wherein for the purpose of illustration are shown several preferred embodiments of the invention, the numeral 10 generally designates the device which is adapted for use when it is desired to attach or disconnect any of the transverse chains 11 to or from the circumferential chains 12 of an anti-skid device. As is well known, continued use of tire chains results in breaking the transverse chains and these transverse chains must of necessity be promptly renewed so as not to damage the tire or mud guard arranged above the same. As illustrated in Figures 1 and 2, the end portions of the transverse chains are provided with attaching links 13 having bills 14 adapted to be connected with the links of the circumferential chains.

The improved tool comprises a gripping handle or arm 15 having its forward portion formed with a shank 16 with which the jaw 17 is formed integral. The jaw 17 extends angularly with relation to the shank 16 and is provided with a lateral projection 18 which forms a support for one of the attaching links 13 of the transverse chain. The link when mounted on the support 18 receives an upstanding tapered centering lug 20 which provides a means for preventing accidental transverse movement of the attaching link while being closed.

A second jaw 22 is connected to the jaw 17 through the medium of a pivot bolt 23 and overhangs the jaw 17 so as to cooperate with the same in pressing the bill 14 of the link inwardly after the same has been engaged with one of the links of the circumferential chain. The forward portion of the jaw 22 is, as illustrated in Figures 2 and 3, extended inwardly and terminates short of the forward end of the jaw 17, so as to be in a position to engage the bill at a point adjacent its free end for pressing the same inwardly. The jaw 22 is formed with a socket 25 which opens out through its forward end for receiving the adjacent link of the circumferential chain during the operation of connecting the attaching link 13 to the circumferential chain. Owing to the pivotal connection between the jaws 17 and 22, the jaw 22, in addition to moving inwardly partakes of a slight forward movement upon being engaged with the bill 14 so that the bill is uniformly pressed inwardly into engagement with the sides of the attaching link.

The jaw 22 is formed with a rearwardly extending shank 26 having its rear end portion slightly enlarged and apertured for receiving a pivot bolt 28. A pair of spaced parallel, longitudinally curved links 30 connected to the end portions of the pivot bolt 28 serve as a means for operatively connecting the shank 26 to the forward portion of the handle 31 which is adapted to be moved in the direction of the handle 15 for drawing the jaws 17 and 22 in the direction of each other. The handle 31 is provided at a point adjacent its forward end with a pair of spaced parallel apertured ears 33 which are arranged at opposite sides of and pivotally connected to an apertured ear 34 of the handle 15 through the medium of a pivot bolt 35.

When the handle 31 is drawn inwardly in the direction of the handle 15, the links 30 will be drawn upwardly and rearwardly so as to impart a pivotal movement to the shank 26. The pivotal movement thus imparted to the shank will result in a forward and inward movement of the jaw 22 and this inward movement of the jaw 22 will cause the bill 14 of the attaching link 13 to be moved inwardly into engagement with the adjacent portion of the link. When the jaw 22 is moved inwardly, the attaching link 13 is prevented from sliding off of the forward end of the support 17 by reason of the fact that the support 17 is curved longitudinally and, therefore, what might be termed a pocket or socket is provided at the rear end of the support so that as the jaw 22 is moved inwardly the link is prevented from forward movement. As indicated in dotted lines, in Figures 2 and 3, the inwardly extended portion of the jaw 22 is recessed intermediate its sides so that accidental lateral movement of the bill of the hook is prevented.

The spreading or opening means for the attaching link comprises claws 38 and 40 which are formed integral with the shanks 16 and 26 and extend oppositely from the jaws 17 and 22. As illustrated particularly in Figure 1, the claws 38 and 40 extend inwardly in the direction of each other and are pointed toward their forward ends so that the same may overlap when drawn together.

When it is desired to spread or open the links, it is merely necessary to insert the pointed portions of the claws between the bill and the adjacent portion of the link and subsequently press the handles 15 and 31 together so that the claws will be drawn inwardly or together with great force. As the claws are drawn in to overlapping relation, the widened portions of the same will effectively spread the link or bill of the same so as to permit of the removal of the transverse chain. When it is desired to renew a plurality of transverse chains in a tire chain, it is merely necessary to first disconnect the attaching links of the same from the circumferential chain in the manner described. The chain may now be laid out upon the ground with the new transverse chains approximately in place. The tool may be arranged at one end of the set of transverse chains to be applied and by connecting a block or rest 42 with the rear end of the handle 15 and by engaging the claw 38 with the ground, the device is arranged in operative position. As illustrated in Figure 1, the block or rest 42 is provided with a transverse opening in its upper side which detachably receives the rear portion of the handle 15. The lower portion of the block 42 is slightly enlarged so as to provide a good bearing surface. As the bill of each link is pressed inwardly by the jaw 22, the tool is moved along to the next transverse chain so that the same may be securely connected to the circumferential chain. By arranging the tool in an approximately horizontal position, the operation is greatly facilitated and a large number of transverse chains may be connected to the circumferential chains in a comparatively short time. It is obvious, however, that the transverse chains may be renewed without the necessity of removing the antiskid device from the tire. This course, however, is followed preferably when there is but a small number of transverse chains to be replaced.

As illustrated in Fig. 2 the bills of the hook bear against the inner portion of the jaws so that when the jaw 22 is moved inwardly, the link will be securely held in position and will not be allowed to partake of any undue endwise movement. The presence of the socket 25 allows the jaw 22 to be moved in the direction of the jaw 17 without unduly crowding the bill of the hook or without removing the same from engagement with the pivotally connected portions of the jaws.

In carrying out the invention, the handles 15 and 31 are as illustrated in Fig. 1 preferably made somewhat flat so as to provide a relatively smooth bearing or gripping surface for the hand. This allows the handles to be tightly gripped without the possibility of the handles biting into the hand. The compound or double leverage produced by employing the link 30 does, however, remove the necessity for tightly gripping the handles for drawing the same together when it is desired to draw the jaws together.

In the form of the invention illustrated in Fig. 4, the handles 46 and 48 are connected directly to the jaws 50 and 51 through the medium of the transversely extending pivot bolt 53. The jaws 50 and 51 are of construction corresponding to the jaws 17 and 22 and are, as are the jaws 17 and 22, adapted for use where it is desired to close the attaching links. The handles are provided opposite the jaws 50 and 51, with claws 54 which are tapered to a point so as to form a wedge for spreading or opening the attaching links.

With reference to the foregoing description, it will be observed that a tool constructed in accordance with this invention will greatly facilitate the operation of replacing the transverse links of tire chains since the one tool performs the operations of removing and attaching the transverse chains. The device may be carried about in the tool box of a motor vehicle since the same occupies but a small amount of space.

It is to be understood that the forms of the invention herewith shown and described shall be taken as preferred examples of the same and that such minor changes and arrangement in the construction of parts may be made as will remain within the spirit of the invention and the scope of what is claimed.

Having thus described the invention, what is claimed as new is:

1. A tire chain tool comprising a pair of pivotally connected jaws, a handle connected to one of said jaws, a shank extending rearwardly from the other jaw, a pair of links connected to the rear portion of said shank and arranged on opposite sides of said handle, and a second handle pivotally connected adjacent its forward end portion to said first named handle and pivotally connected at its forward end to said links for operatively connecting said second named handle to said links.

2. A device of the class described comprising a pair of pivotally connected claws having their end portions extending inwardly and adapted to overlap, said inwardly extending portions of said claws being arranged in wedge shaped formation for forming spreading members, a shank extending rearwardly from one of said claws, a handle extending rearwardly from the other claw, a link pivotally connected to the rear portion of said shank, and a handle pivotally connected to said first named handle and to said link.

3. A tire chain tool comprising a pair of pivotally connected jaws one having a horizontal bearing surface and provided at its outer end with a medial upstanding centering lug, the other jaw being formed at its outer end with a depending lip disposed to close in the rear of said lug when the jaws are swung toward each other.

4. A tire chain tool comprising a pair of pivotally connected jaws, one having a longitudinally directed convex bearing surface and provided at its outer end with a medial upstanding centering lug, the other jaw being formed at its outer end with a depending lip disposed to close toward said surface near the inner end of the first jaw when the jaws are swung toward each other.

5. A tire chain tool including pivotally connected members one provided with a forwardly directed jaw and a depending forwardly turned jaw extending in a direction beneath the first jaw and the other of said members being provided with spaced jaws to cooperate with said first mentioned jaws, the jaws being held against individual movement.

6. A tire chain tool including pivotally connected members one provided with oppositely directed oppositely turned jaws and the other of said members being provided with spaced jaws to cooperate with said first mentioned jaws, the jaws being held against individual movement.

7. A tire chain tool comprising pivotally connected members one having a forwardly projecting jaw and a depending forwardly turned jaw and the other of said members having oppositely directed oppositely turned jaws disposed to cooperate with said first mentioned jaws respectively, the jaws being rigidly connected with the members to be held against individual movement.

In testimony whereof I affix my signature.

PHILIP J. SHOUGH. [L. S.]